(12) United States Patent
Nuss

(10) Patent No.: US 11,827,131 B2
(45) Date of Patent: Nov. 28, 2023

(54) ARMREST

(71) Applicant: Ralph Nuss, Poppenricht (DE)

(72) Inventor: Ralph Nuss, Poppenricht (DE)

(73) Assignee: GRAMMER AG, Ursensollen (DE)

( * ) Notice: Subject to any disclaimer, the term of this patent is extended or adjusted under 35 U.S.C. 154(b) by 0 days.

(21) Appl. No.: 17/743,068

(22) Filed: May 12, 2022

(65) Prior Publication Data

US 2022/0371495 A1  Nov. 24, 2022

(30) Foreign Application Priority Data

May 18, 2021 (DE) .......................... 102021112868.4

(51) Int. Cl.
*B60N 2/70* (2006.01)
*B60N 2/75* (2018.01)
*B60N 2/02* (2006.01)

(52) U.S. Cl.
CPC ........... *B60N 2/767* (2018.02); *B60N 2/0232* (2013.01); *B60N 2/753* (2018.02)

(58) Field of Classification Search
CPC ...... B60N 2/767; B60N 2/753; B60N 2/0232; B60N 2/77; B60N 2/777
USPC .................................................... 297/411.38
See application file for complete search history.

(56) References Cited

U.S. PATENT DOCUMENTS

| 7,469,964 | B2* | 12/2008 | Baumann | B60N 2/757 244/118.6 |
| 7,677,654 | B2* | 3/2010 | Enberg | B60N 2/77 297/411.32 |
| 10,723,249 | B2 | 7/2020 | Dry | |
| 10,913,380 | B2 | 2/2021 | Kotz | |
| 2011/0236130 | A1* | 9/2011 | Klein | B60N 2/797 297/344.21 |
| 2019/0135151 | A1* | 5/2019 | Burton | B60N 2/0252 |
| 2020/0345146 | A1 | 11/2020 | Himmelhuber | |

FOREIGN PATENT DOCUMENTS

FR  2885329 A  11/2006

* cited by examiner

*Primary Examiner* — Mark R Wendell
(74) *Attorney, Agent, or Firm* — Andrew Wilford

(57) ABSTRACT

The invention relates to an armrest with a support (15) for a vehicle seat (10), the support being movable by a side mechanism (27), relative to a base between a proximal and a distal position and is pivotable by a pivot assembly (28), between a first pivot position and a second pivot position, wherein the side mechanism (27) comprises a first part (16) of the base and a second part (18) on the support (15), wherein the first part (16) is connected to the second part (21) by an articulation (37).

14 Claims, 12 Drawing Sheets

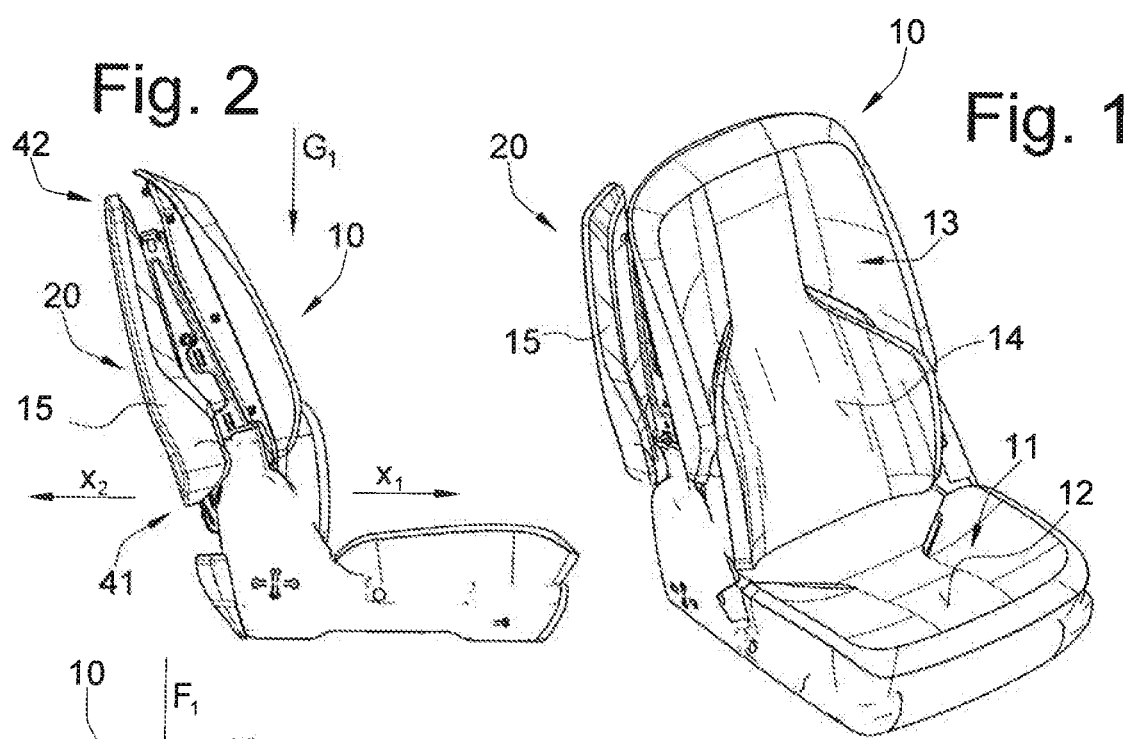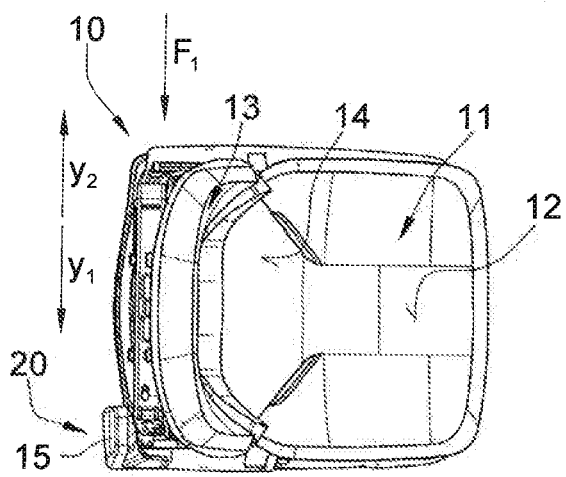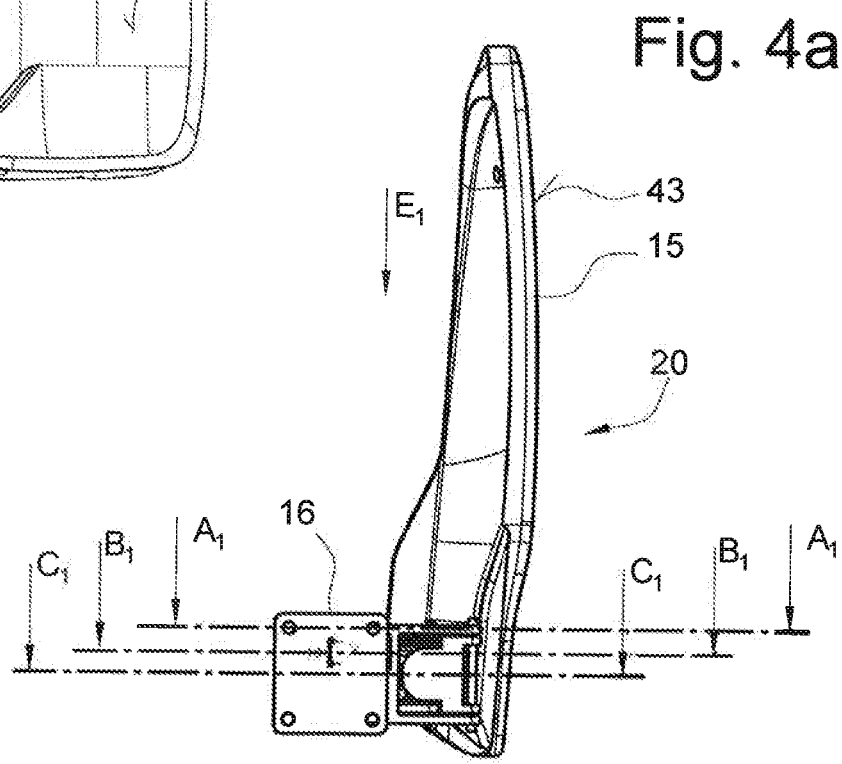

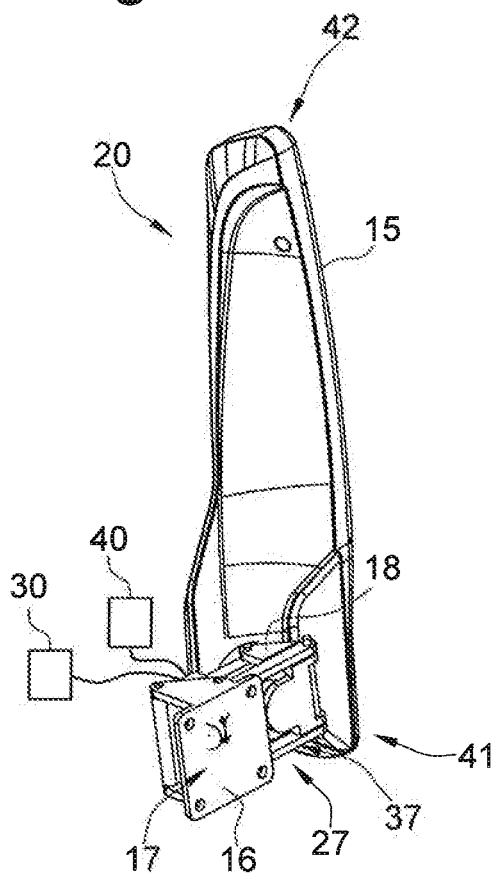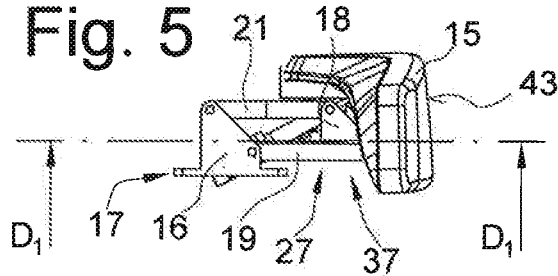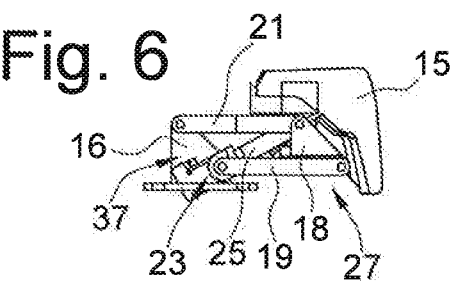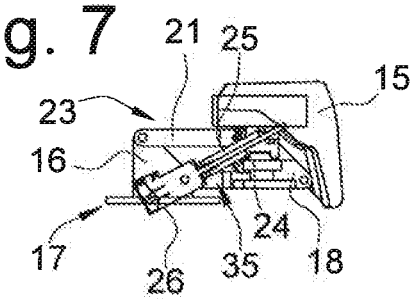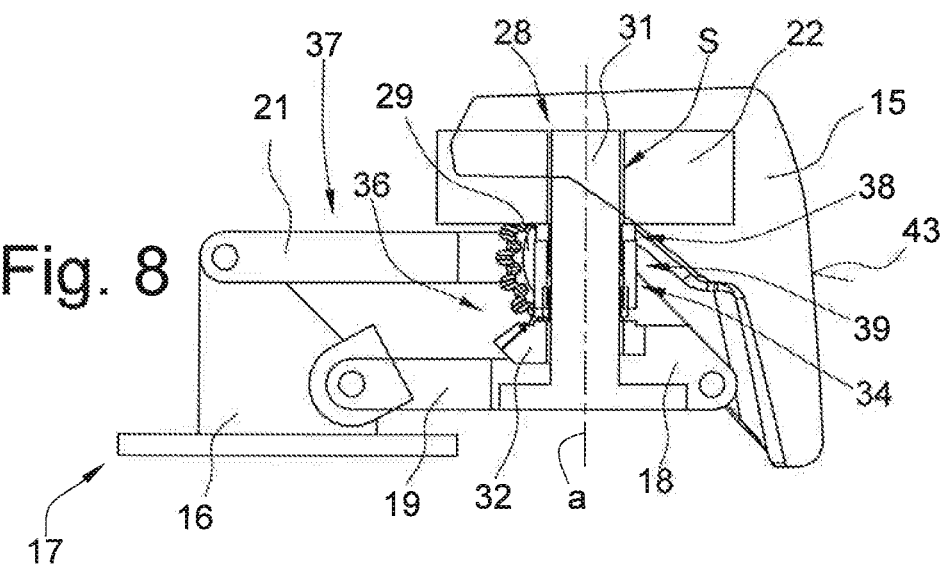

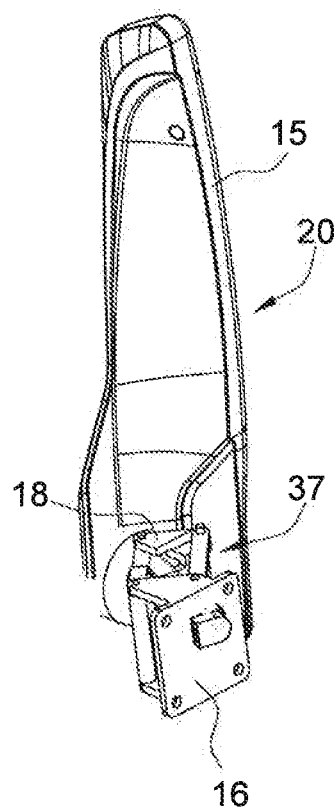
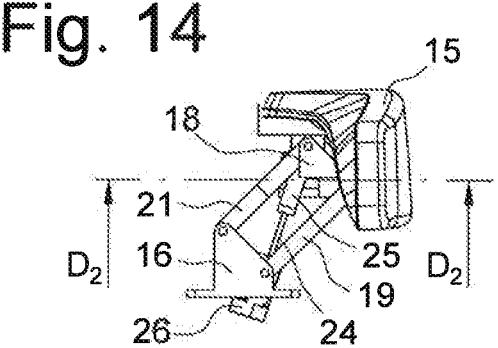
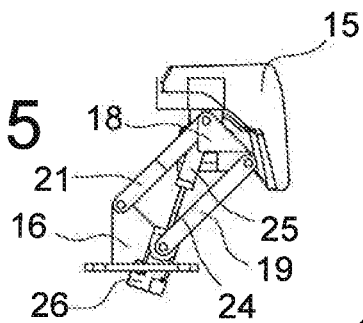
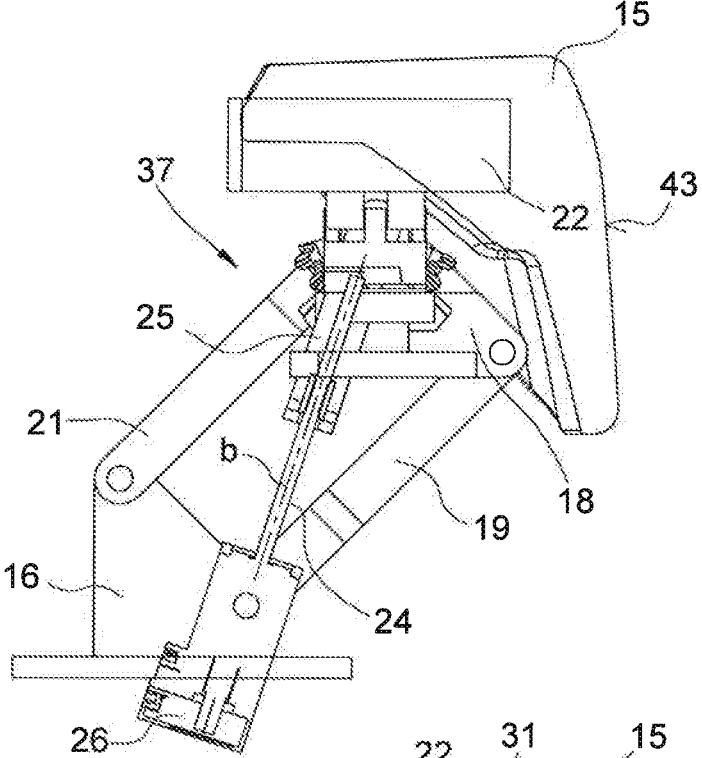
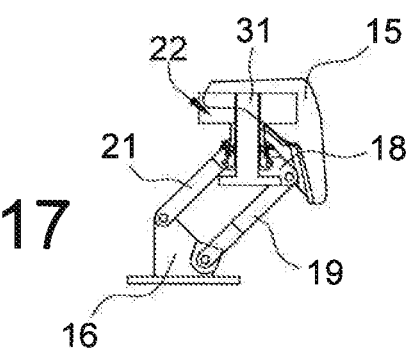

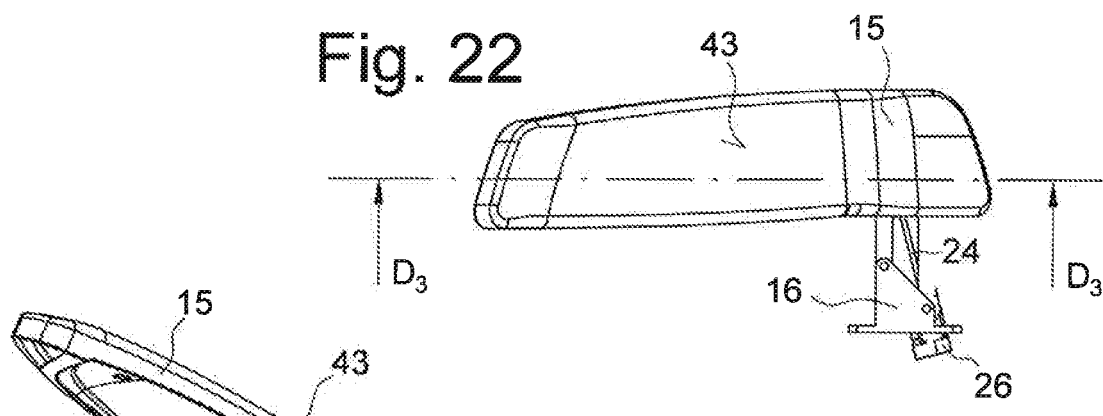
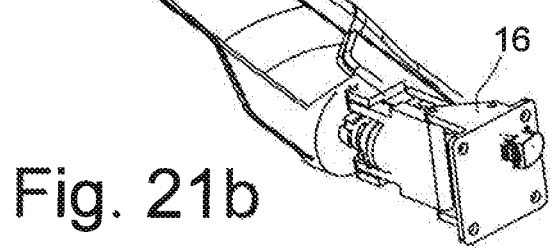
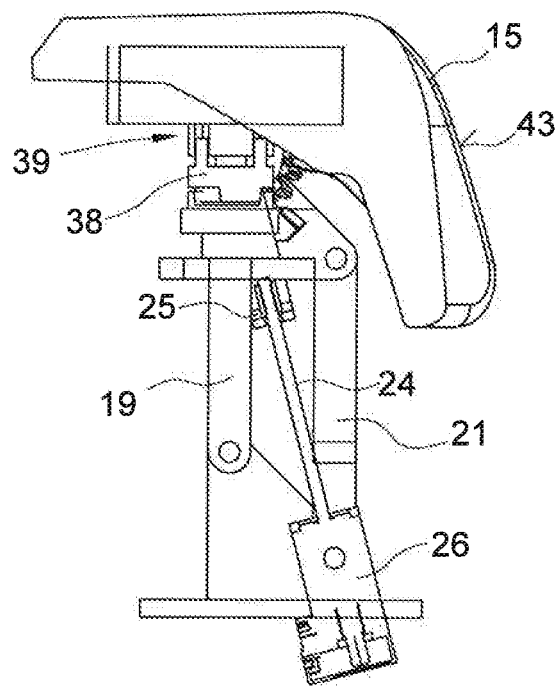
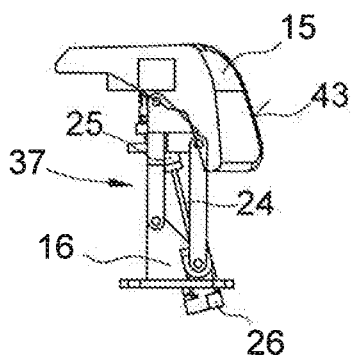
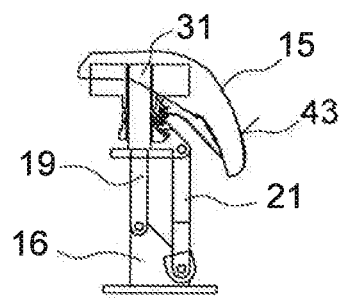

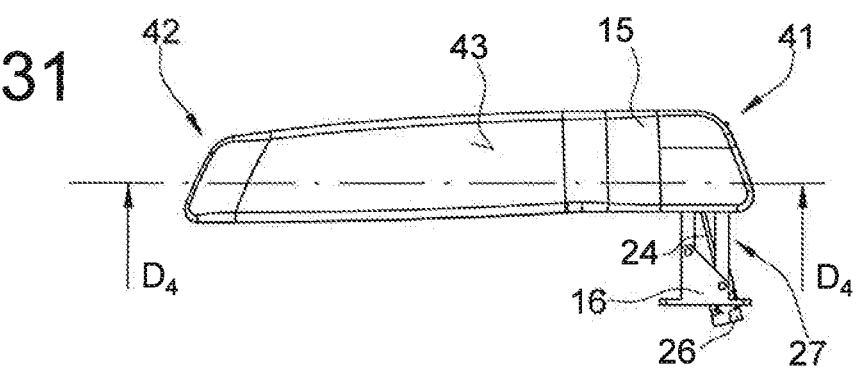
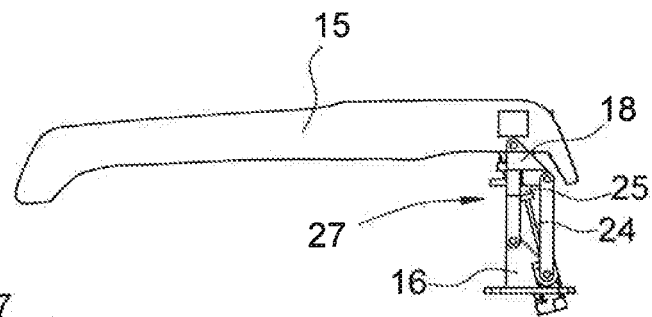
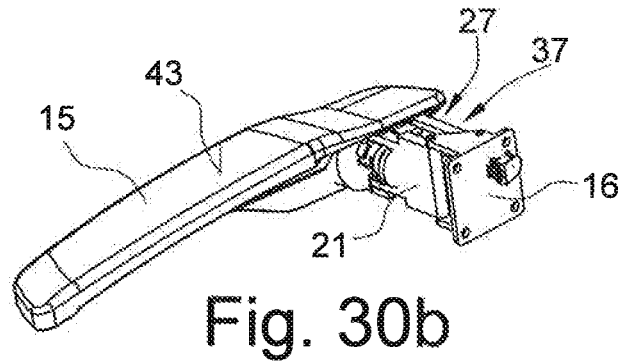
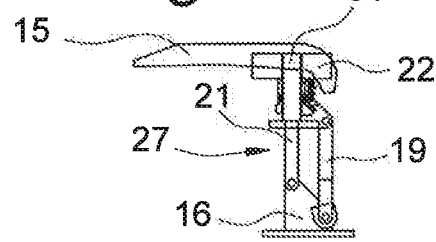
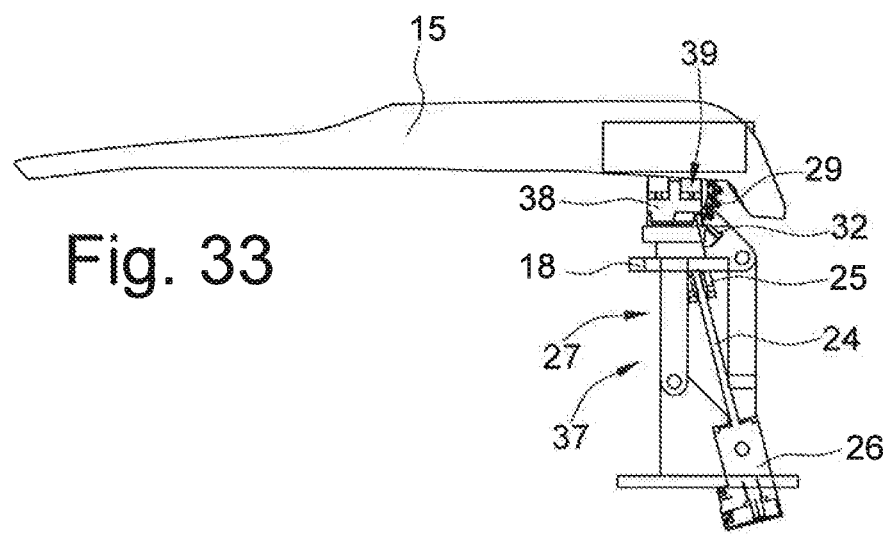

ARMREST

FIELD OF THE INVENTION

The invention relates to an armrest of a seat, in particular a vehicle seat. A vehicle in the context of the invention can be a land vehicle, an aircraft or a watercraft.

BACKGROUND OF THE INVENTION

Such an armrest is known from 10 2019 000 119 [US 2020/0345146]. The support of this armrest comprises a seat-fixed guide tube, in which a support-fixed axle is guided and driven in such a way that the axle is initially laterally removable from the seat and thereafter can be pivoted into a use position. To that end, a slotted link is provided in the guide tube, which link only allows for pivoting when the support has been removed from the seat. The lateral movement is effected by a motor that upon movement of the support into the remote position stresses a spring. The inverted movement is driven by the spring.

OBJECT OF THE INVENTION

The object of the invention was to create an armrest requiring little installation space and producible using relatively little manufacturing effort.

SUMMARY OF THE INVENTION

The armrest includes a support movable relative to the seat using a side mechanism, between a first proximal position and a third distal position. In doing so, the support is pivoted between the proximal position and the distal position via a second intermediate position. In the proximal position, the support is for example received in a backrest of the seat and/or for example parallel to a sagittal plane in an X-direction behind the seat, or lateral from or behind an occupant resting surface of the seat. In the distal position, the support is for example spaced laterally and in parallel to a transverse plane, in a Y-direction, from the backrest, in such a way that pivoting of the support is possible.

The words sagittal plane, transverse plane, proximal and distal are terms describing planes of the body of a seat occupant, but in this case are also used to refer to the vehicle seat per se, in which the occupant is now seated in a predetermined seating posture.

The support is pivotable between a first position and a third position by a pivoting mechanism of the armrest. The armrest is pivoted beyond a second intermediate position between the first position and the second position. In the first position, a longitudinal axis of the support is for example in the range of a vertical, however, the angle may deviate therefrom. The deviation can be up to 25°, in particular 0° to 15°. The first position is an approximately vertical position, for example. In the third position, the longitudinal axis of the support is for example in the range of a horizontal, but can deviate therefrom by up to 25%, in particular 0° to 15°. The third position is an approximately horizontal position, for example.

The side mechanism includes an articulation with a first part fixable to a seat and a second part on the support. The articulation forms at least one linkage with the first part and with the second part, for example. Using the linkage, the second part connected to the armrest is movable relative to the first part on a coupling curve between a first position and a third position. Movement of the second part takes place in a horizontal X-Y-plane for example without any substantial vertical movement proportion in a Z-direction. The first part is for example pivotally connected to at least one link, the link being furthermore pivotally connected to the second part.

The articulation includes a four-bar linkage, for example. In this case, the support is guided on a defined movement trajectory formed by a coupler curve defined by the four-bar linkage. The four-bar linkage comprises for example at least one first link and at least one second link, wherein each link forms a pivot joint with the first part and also forms a pivot joint with the second part. The four-bar linkage can, in order to increase stability, be configured as a multiple four-bar linkage having multiple first links and multiple second links or arbitrary combinations thereof. The four-bar linkage comprises two first links and two second links, for example. Alternatively, the two first links can be part of a first bracket and the two second links can be part of a second bracket. The links of the four-bar linkage pivot by approximately 90° upon movement between the first and the third position, for example.

Advantages of movement of the side mechanism by a linkage are for example stable guidance and a favorable movement characteristic of the support.

The pivot assembly comprises for example the second part and a support-fixed pivot part, wherein the second part and the pivot part together form a pivot joint. Instead of the second part, an element fixed thereto can also be part of the pivot assembly. The second part and the pivot part define a pivot axis, about which the support is pivotable between the first position and the second position.

Movement of the side mechanism and/or the pivot assembly can take place manually for example such that a drive is not necessary.

The side mechanism and/or the pivot assembly alternatively comprise for example at least in a partial range of their movement, a drive. That is, the side mechanism and/or the pivot assembly comprise a drive in the complete range of their movement, for example. Alternatively, the side mechanism and/or the pivot assembly comprise, merely in a partial range, a drive. A drive can comprise a lateral transmission for movement of the side mechanism and/or a slew transmission for movement of the pivot assembly.

According to one alternative, the side mechanism and the pivot assembly are coupled via a gear and move in a synchronized manner. The gear is driven by only one drive, for example.

The transmission ratio of the respective gear can be 1:1 for example but can alternatively be of other transmission ratios. The transmission ratio can for example be provided in order to be able to better modulate movement and to have impact on the forces. This way, the rotation speed of a drive motor usually rotating at high speed can be translated in such a way that a desired motion speed is achieved in the lateral movement and/or in the pivot movement.

Via the transmission ratio, given the case that only one drive is provided for setting the movement range of the respective mechanism, that is the side mechanism and pivot assembly. The side mechanism is driven over the entire movement range, for example. Using the transmission ratio of the slew transmission for example the pivot assembly can be set to be driven only over a part of movement, e.g. 45°.

According to one alternative for example only the side mechanism is driven. In this case, the pivot assembly can include an energy-storage unit, for example. The support is moved into the third position by a potential energy, for example. Movement into the first position is backed up by an energy-storage unit, for example.

According to a further alternative, the side mechanism is for example completely driven and the pivot assembly is driven at least in a partial range. In this case, it is possible to only drive the four-bar linkage and to also use movement of the four-bar linkage for moving the pivot assembly or to provide two separate drives for the side mechanism and the pivot assembly, for example. These drives are then actuated separately as required.

It is possible in all variants to implement a part of movements using an energy-storage unit, e.g. a spring, or for this spring to act in a supporting manner.

The lateral transmission and/or the pivot gear in each case include at least one drive, for example in the form of a motor and/or an energy-storage unit for moving the respective side mechanism and/or the pivot assembly. In the context of the invention, an energy-storage unit can as well be for example a potential energy or a dynamic energy of an element, for example of the support. For example, only a motor or in each case one motor for example can be present as a drive for the lateral transmission and the slew transmission. The mechanism is moved by an electric motor, for example. The electric motor can for example drive a rotating part, for example a spindle nut or a spindle or a toothed gear mechanism. Alternatively or in addition, the mechanism can also be driven by an energy-storage unit, e.g. by a spring.

The relative movement of a first link of the four-bar linkage relative to a second link of the four-bar linkage or to a part in a defined position relative to the second link is, according to a particular embodiment, used for driving the pivot movement of the support. The relative movement of the links is used for example for moving a first gear supported on the first link of the four-bar linkage relative to a second gear supported on a second link of the four-bar linkage in a fixed or movable manner. For example, the first gear is configured by a first toothed gear and the second gear is configured by a second toothed gear pivotally supported on the second link of the four-bar linkage. The second toothed gear is connected to the support, for example.

At least one of the drives of the lateral transmission and the slew transmission comprises for example a spindle engaged with a spindle nut, with the spindle or the spindle nut being drivable. This way for example the side mechanism, in particular the four-bar linkage, can be adjusted between the two end positions.

At least one of the drives of the lateral transmission and the slew transmission comprises for example at least two meshing toothed gears. For example, one toothed gear is on the support and the other toothed gear is on the lateral transmission or to the vehicle, in particular to the vehicle seat. The slew transmission comprises a pair of toothed gears, for example.

One of the links of the linkage is directly driven on at least one pivot joint, for example. Alternatively or in addition, the pivot axle is directly driven.

At least one of the drives of the lateral transmission and the slew transmission is releasably couplable, e.g. by at least one coupling in the broadest sense, with the respective side mechanism or the pivot assembly. In the context of the invention, the term coupling refers both to separable coupling elements and to a control structure having two elements, with one element catching the other element not sooner than past a certain range of the freewheel. In other words, mechanically transmitting of the control structure from a first element to a second element is effected not sooner than past a certain movement range of the first element. In the context of the invention, the term couplable is to cover both the operations of coupling as well as decoupling. That is, the drive can be separated from the respective mechanism in such a way that the drive is able to move irrespective thereof.

With these features, it is possible for the support, under avoidance of the drive, to be moved partially or completely manually between the first position and the third position and/or between the primary and the third position. With these features, it is possible to use one drive for the lateral transmission and for the slew transmission, wherein this drive does not result in every region in a movement of the pivot assembly and/or of the side mechanism. This way for example both the lateral transmission and the slew transmission can be driven simultaneously, although this does not mandatorily result in a pivot movement of the support in all ranges of movement.

For example, the drive is activated for movement of the support from the stowing position into the use position, with the lateral transmission and the slew transmission being moved. However, in this case, at first merely the side mechanism is moved, for example. Movement of the pivot assembly is induced, due to cooperating coupling formations of the slew transmission, only when the support is spaced laterally from the backrest to such an extent that the backrest is no longer within the pivot trajectory of the support.

The support is for example pivoted manually upward by about 45 degrees from an approximately horizontal, third position in the disengaged state of the slew transmission. Movement into the approximately vertical first position is then assumed by the slew transmission after coupling-in of the latter. This way for example movement can be effected manually in an ergonomically acceptable range that can be enabled more quickly, for example. In a remaining movement range of the support that can only be or is to be realized or supported in a complicated manner, movement is then effected by the drive.

According to one embodiment, the armrest comprises a locking device that can lock the side mechanism and/or the pivot assembly in at least one position. For example, the side mechanism and/or the pivot assembly can be locked in at least one final position. In other words, the side mechanism can be locked in the first position and the third position, for example. The pivot assembly can be locked in the first position and the third position, for example.

Embodiments of the invention are described by way of example in the following description of the Figures, also with reference to the drawings. Here, for the reason of clarity—also in case of addressing different embodiments—same or equivalent parts or elements or regions are denoted with the same reference characters, in part with the addition of lowercase letters.

Within the scope of the invention, features that are only described in conjunction with one embodiment can as well be provided in any other embodiment of the invention. Embodiments modified in this manner are—even if not illustrated in the drawings—also within the scope of the invention.

All of the disclosed features are individually essential to the invention. Further fully incorporated into the disclosure of the application is the disclosure content of the associated priority documents (copy of the prior application) as well as of the cited documents and the described devices from prior art, also for the purpose of incorporating individual or multiple features of these documents into one or more claims of the present application.

BRIEF DESCRIPTION OF THE DRAWING

In the drawing:

FIG. 1 is a perspective view of a vehicle seat with the armrest according to the invention as part of the seat, wherein the support is in a non-use position, FIG. 2 is a side view of the vehicle seat according to FIG. 1;

FIG. 3 is a view according to arrow $G_1$ in FIG. 2,

FIG. 4a is a view according to arrow $F_1$ in FIG. 3, with the armrest being depicted without the remaining components of the vehicle seat for reasons of clarity, FIG. 4b is a perspective view of the support according to FIG. 4a;

FIG. 5 is a view according to arrow $E_1$ in FIG. 4a,

FIG. 6 is a section according to sectional line $A_1$-$A_1$ in FIG. 4a,

FIG. 7 is a section according to sectional line $B_1$-$B_1$ in FIG. 4a,

FIG. 8 is a section according to sectional line $C_1$-$C_1$ in FIG. 4a,

FIG. 9b is a detail view according to detail $H_1$ in FIG. 9a,

FIG. 13b is a perspective view of the armrest according to FIG. 13a, FIG. 14 is a view according to arrow $E_2$ in FIG. 13a, FIG. 15 is a section according to sectional line $A_2$-$A_2$ in FIG. 13a, FIG. 16 is a section according to sectional line $B_2$-$B_2$ in FIG. 13a, FIG. 17 is a section according to sectional line $C_2$-$C_2$ in FIG. 13a, FIG. 18a is a section according to sectional line $D_2$-$D_2$ in FIG. 14, FIG. 21b is a perspective view of the armrest according to FIG. 21a, FIG. 22 is a view according to arrow $E_3$ in FIG. 21, FIG. 23 is a section according to sectional line $A_3$-$A_3$ in FIG. 21a, FIG. 24 is a section according to sectional line $B_3$-$B_3$ in FIG. 21a, FIG. 25 is a section according to sectional line $C_3$-$C_3$ in FIG. 21a, FIG. 26a is a section according to sectional line $D_3$-$D_3$ in FIG. 22, FIG. 30b is a perspective view of the support according to FIG. 30a, FIG. 31 is a view according to arrow $E_4$ in FIG. 30a, FIG. 32 is a section according to sectional line $A_4$-$A_4$ in FIG. 30a, FIG. 33 is a section according to sectional line $B_4$-$B_4$ in FIG. 30a, FIG. 34 is a section according to sectional line $C_4$-$C_4$ in FIG. 30a, FIG. 35 is a section according to sectional line $D_4$-$D_4$ in FIG. 31.

SPECIFIC DESCRIPTION OF THE INVENTION

Figure 9A:
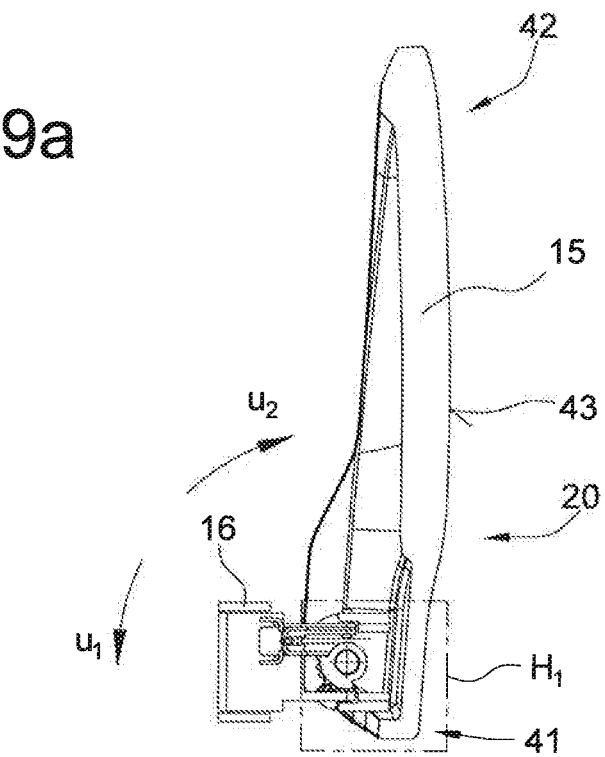
FIG. 9a is a section according to sectional line $D_1$-$D_1$ in FIG. 5.

An overall vehicle seat is denoted with reference character 10 in the Figures.

The vehicle seat 10 according to FIG. 1 includes a seat part 11 having a seating surface 12 and a backrest 13 having a resting surface 14. The resting surface 14 faces in a direction $x_1$, parallel to a sagittal plane of a seat occupant. A direction $x_2$ extends opposite the direction $x_1$.

The vehicle seat 10 comprises an armrest 20 configured in accordance with the features of the invention. The armrest 20 includes a support 15 that includes a proximal fastening end region 41 and a free end region 42 and a support surface 43. The support 15 is movable by a side mechanism 27 in directions $y_1$ and $y_2$ between a proximal first position illustrated in FIGS. 1 to 4 and a distal third position illustrated in FIGS. 19 to 36.

The lateral movement of the support 15 is effected via a second position illustrated in FIGS. 11 to 18b, in which the side mechanism 27 is in an intermediate position between the first position and the second position. In the first position, the support 15 is proximal with respect to the directions $y_1$ and $y_2$ relative to the backrest 13, i.e. close to the backrest 13, and in the third position, the support 15 is distal relative to the backrest 13, i.e. in the direction $y_2$ remote from the backrest 13.

The support 15 is pivotable in the rotational directions $u_1$ and $u_2$ between a first position (see FIGS. 1 to 18b) and a third position about a pivot axis a shown in FIGS. 27 to 36, for example by a pivot assembly 28. An intermediate position between the first position and the third position is referred to as a second position and illustrated in FIGS. 19 to 26b.

The support 15 can be pivoted upwards in the reverse direction $u_2$ between the third position and the first position of the pivot assembly 28 and can be moved from the third position into the first position of the side mechanism 27.

It can be taken from FIGS. 1 and 3 that in the first position, the support 15 is partially behind an occupant resting surface of the backrest 13 in the X-direction, such that pivoting of the support 15 in the direction $u_1$ according to FIG. 2 would not be possible because the backrest 13 would then be in movement trajectory of the support 15. In this position, the support 15, e.g. laterally, with respect to the direction $y_2$, does not or only slightly protrude beyond the dimensions extending in the directions $y_1$ and $y_2$ of the seat part 11 and of the backrest 13.

FIGS. 4a and 4b show a separate illustration of the armrest 20 without the remaining components of the vehicle seat. For the lateral movement in the directions $y_1$ and $y_2$ between the first position and the third position of the support 15, the side mechanism 27 is provided as described above, which is explained in greater detail in the following. A first part 16 comprises fixing means 17 in the form of a flange (see FIGS. 5 to 9a) that firmly fixes it to the structure of the backrest 13. A second part 18 is connected to the support 15.

The first part 16 and the second part 18 are connected to one another by an articulation 37. The articulation 37 is for example configured as a linkage, in particular, as in the present embodiment, as a four-bar linkage. Movement of the second part is effected for example in a horizontal x-y-plane without any significant vertical z-portion of movement.

In this embodiment, the articulation 37 includes a link 19 and a link 21. Each of the links 19 and 21 forms a pivot joint with the first part 16 and with the second part 18. The first part 16, the second part 18 and the links 19 and 21 form a four-bar linkage 23. The support 15 is therefore movable on a coupler curve between the first position and the third position by the four-bar linkage 23. The first position and the third position of the lateral movement mechanism 27 are set by non-illustrated stops.

The second part 18 additionally serves as a support for a part of the pivot assembly 28. This part, together with a pivot structure 22 having the support 15 fixedly connected thereto, forms a pivot joint S. The support 15 is pivotally held by the pivot joint S about the pivot axis a formed by the physical axle 31 fixedly connected to the second part 18, between the first position and the third position on the second part 18. The first position and the third position of the pivot assembly 28 are defined by non-illustrated stops.

The support 15 could basically as well be moved manually into defined positions and locked there. That is, the lateral movement and the pivot movement could be performed manually.

Alternatively, it would also be possible for all the above-mentioned movements of the support 15, that is, movement between the first and the third position of the side mechanism 27 as well as movement between the first position and the third position of the pivot assembly 28, to be effected in a manner completely driven by at least one drive.

According to a further alternative, it would be possible for the lateral movement and/or the pivot movement to be effected in a driven manner at least in a partial range of movement.

In the present embodiment, movement of the support 15 is effected in a partly automated manner. Movement between the first position and the third position is completely driven with respect to both movement directions. To this end, the armrest 10 comprises a drive with a motor and a lateral transmission 35.

Movement between the first position and a second position (see FIG. 19) is effected, for instance, over an angle of approximately 45° relative to the first position and in a motor-driven manner. To this end, the armrest 10 comprises a slew transmission 36. Movement between the secondary and the third position takes places automatically and is driven by the potential energy of the support 15.

In the present embodiment, the side mechanism and the pivot assembly are driven by only one drive 26, e.g. an electric motor. As an alternative, it would also be possible for the side mechanism to be driven by a first drive and for the pivot assembly to be driven by a second drive.

In the present embodiment, the lateral transmission 35 includes a spindle 24 engaged with a spindle nut 25 (see e.g. FIG. 7) and pivotally connected with the first part. The spindle nut 25 is fixedly connected to one of the links 19 or 21, in the present case with the link 21. The spindle 24 is rotatable about its longitudinal center axis b by a motor 26. This way, the support 15 can be adjusted between the first and the third position of the side mechanism 27 by the lateral transmission 35, in the present case the spindle 24 and the spindle nut 25. Already in the second position (see FIG. 10), in which the links 19 and 21 are pivoted by about 45° with respect to the first position, the support has moved in the direction $y_1$ to such an extent that the backrest 13 is not in the pivot trajectory between the first position and the third position of the support 15.

The slew transmission 36 for movement between the primary and the second position includes, in the present embodiment, a first gear 29, here in the form of a first toothed gear (see FIGS. 9a and 9b) on the link 21 and fixedly connected to this link 21 in a stationary fixed manner, and a second gear 32, here in the form of a second toothed gear connected to the support 15 in a rotatory manner and rotatable relative to the axle 31 in the directions $u_1$ and $u_2$. The axle 31 is fixedly held on the second part 18. The first gear 29 and the second gear 32 are in the present case configured merely by quadrant sector gears. They could alternatively also be configured differently, e.g. as gear wheels. The slew transmission 36 and the lateral transmission 35 are moved simultaneously.

In the present embodiment, the slew transmission 36 is driven by the relative movement of the linkage, by the relative movement of a part of the side mechanism 27 relative to the second toothed gear 32.

The armrest 10 comprises a coupling 34 illustrated in FIGS. 16 and 24, for example. The support 15 can be decoupled from the drive mechanism in such way that it is manually movable by the coupling 34. In the present embodiment, the coupling 34 includes a first coupling formation 38 connected to the support 15 and a second coupling formation 39 fixedly connected to the second toothed gear. Depending on the relative rotary position with respect to the second coupling formation 39, the first coupling formation 38 can be moved releasably in engagement with the second coupling formation 39.

The coupling formations 38 and 39 form control structures, that is, the coupling includes a freewheel range, in which the coupling formations 38 and 39 are not engaged, and an engagement range, in which the coupling formations 38 and 39 are engaged. In other words, the coupling formations 38 and 39 move in engagement in certain relative positions of the first gear with respect to the second gear 32. Transmission of movement of the second gear takes place when the coupling formations 38 and 39 are in engagement in an engagement position. In a release position, the coupling formations 38 and 39 are disengaged and no transmission takes place.

In the present embodiment, the coupling formations 38 and 39 are engaged when the side mechanism 27 has moved from the first position into the second position. Between the first position and the second position of the side mechanism 27, the coupling formations 38 and 39 are in the release position.

The armrest 10 further comprises a controller 30 that cooperates with a non-illustrated sensor device 40. The latter comprises non-illustrated position sensors. The controller 30 controls the motor 26. The sensors of the sensor device 40 detect whether the side mechanism is in the first or the third position and whether the pivot assembly 28 is in the first position or the third position or whether it has been moved from the third position into the second position and reached the second position.

In the following, the entire motion sequence of the support 15 will be once more explained completely.

The sensor device 30, after operation of a non-illustrated switch by a seat occupant for example receives the signal that the support 15 is to be translated from the non-use position into a use position. FIGS. 1 to 9*b* show the support 15 in the non-use position. The controller 30 then activates the drive 26. This drive moves the spindle nut 25 of the lateral transmission 35 in such a way that the side mechanism 27 is moved in a first movement direction of the coupler curve. Due to movement of the side mechanism, the slew transmission 36 is also driven in such a way that the gears 38 and 39 roll off onto each another as well. The changes of the relative positions of the four-bar linkage relative to the second gear 32 are used as a drive, in order to pivot the support 15.

Figure 9B:
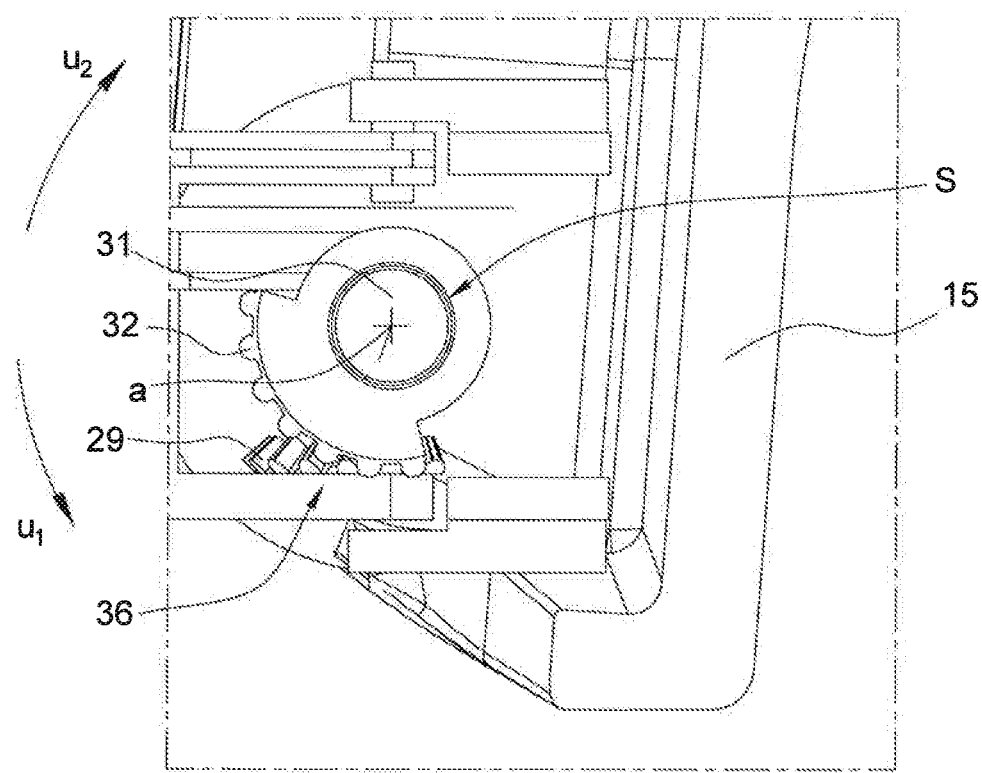
Figure 11:
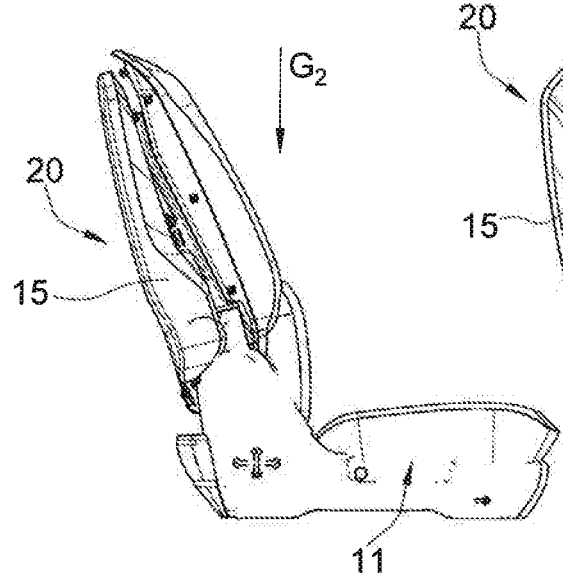
FIG. 11 is a side view of the vehicle seat according to FIG. 10.
Figure 10:
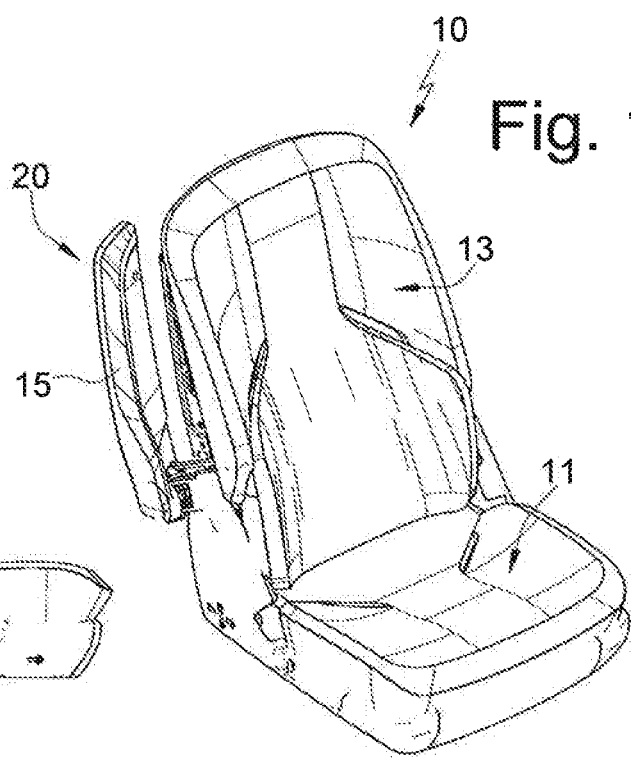
FIG. 10 is a perspective view of the vehicle seat according to FIG. 1, with the support in a second position of the side mechanism between the proximal and the distal position.
Figure 12:
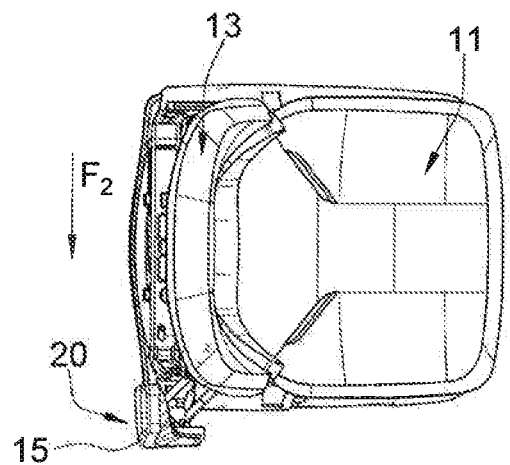
FIG. 12 is a top view according to arrow $G_2$ in FIG. 11.
Figure 13A:
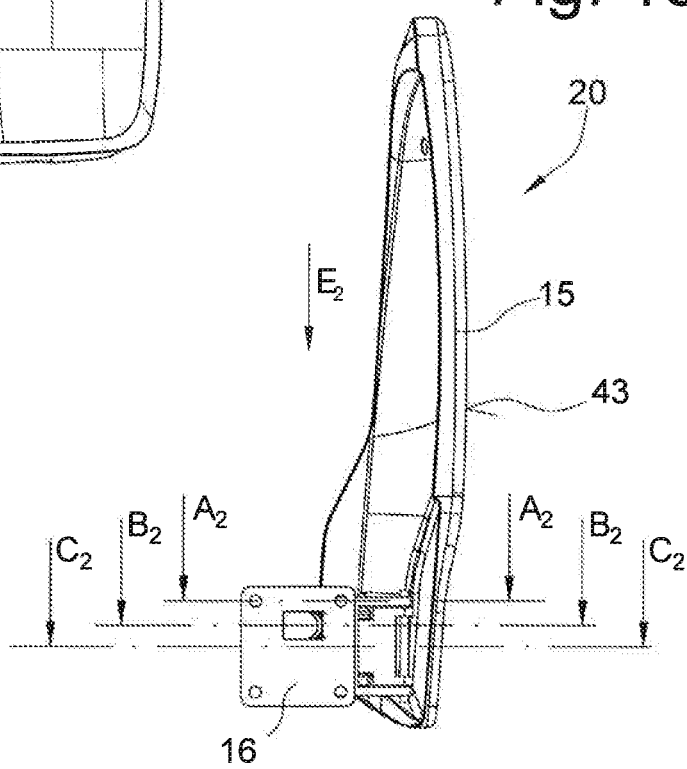
FIG. 13a shows the armrest according to arrow $F_2$ in FIG. 12, with the vehicle seat not illustrated for reasons of clarity.
Figure 18A:
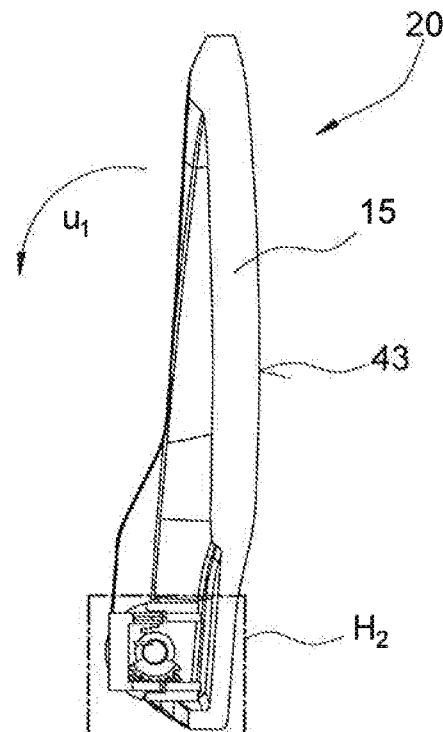
FIG. 18b is a detail view according to detail $H_2$ in FIG. 18a, FIG. 19 is a side view of the vehicle seat according to FIG. 11, with the support in the third position of the side mechanism and in a second position of the pivot assembly between the first position and the third position.
Figure 18B:
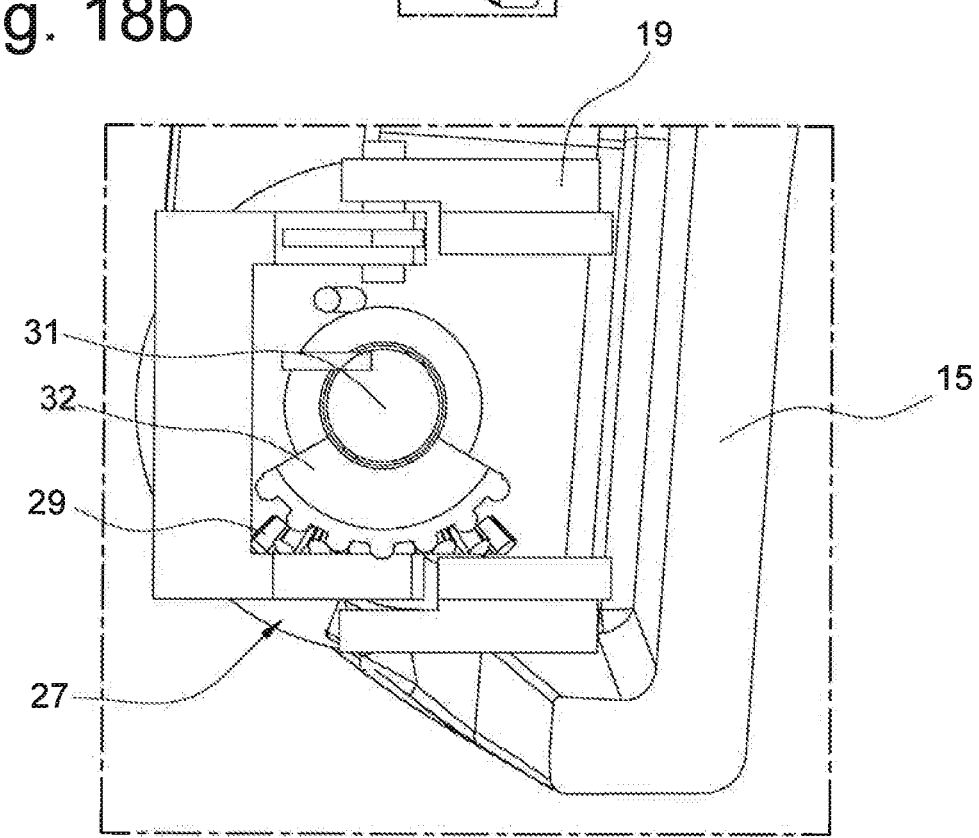
Figure 19:
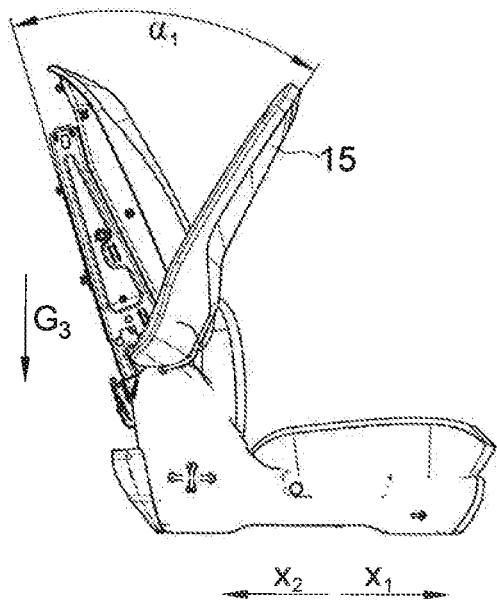
Figure 20:
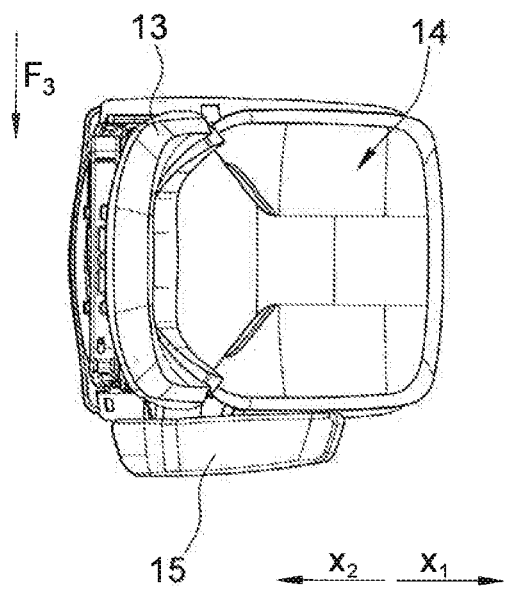
FIG. 20 is a top view according to arrow $G_3$ in FIG. 19.
Figure 21A:
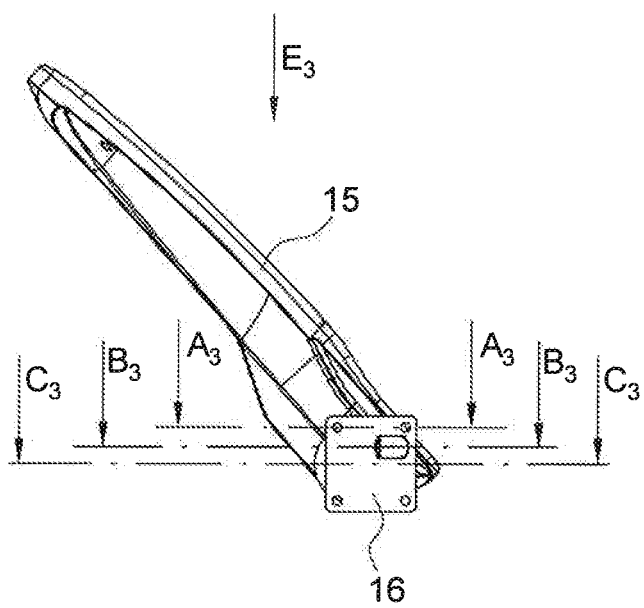
FIG. 21a is a view according to arrow $F_3$ in FIG. 20, with the armrest illustrated without the remaining components of the vehicle seat.

At the start of movement, the lateral drive is in the position according to FIG. 7 and the slewing drive 36 is in the position according to FIG. 9*b*.

Due to the freewheel range of the coupling 34, the slew transmission 36 rolls off onto one another in a certain region without the support 15 moving out of the first position (see FIGS. 1 and 10-18*b*). When the freewheel range is overcome and the coupling formations 38 and 39 are in the engagement position, which is the case in the second position of the side mechanism 27 (see FIGS. 10 to 18*b*), the slew transmission 36 drives the support 15 in the direction $u_1$ in the further movement. In the engagement position, the gears 38 and 39 have the position according to FIG. 18*b*.

If the support 15 has traveled a certain pivot angle in the direction $u_1$ from the first position, the weight force is applied onto the support 15 in the direction u1. The coupling 34 allows for movement in the direction $u_1$. Using a rotation damper, the support 15 is prevented from moving into the third position according to FIGS. 27 to 36 in the direction $u_1$ in an unrestrained manner due to the weight force when applied with a load.

Figure 26A:
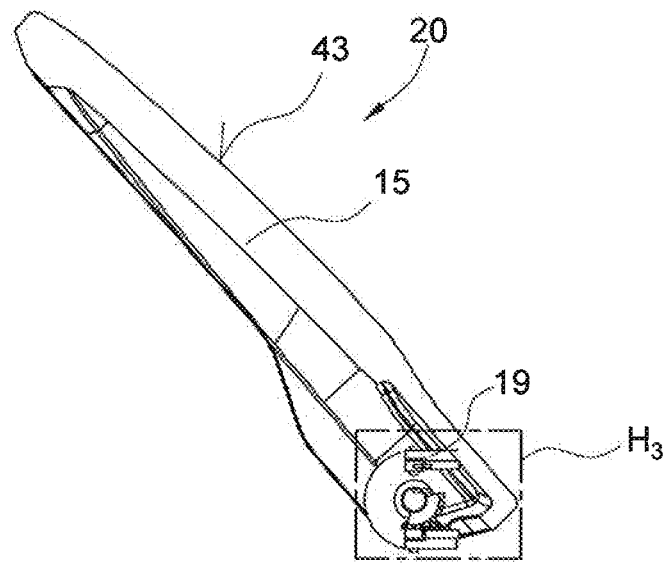
FIG. 26b is a detail as shown at $H_3$ in FIG. 26a, FIG. 27 is a perspective illustration of the vehicle seat, with the support in a use position.
Figure 26B:
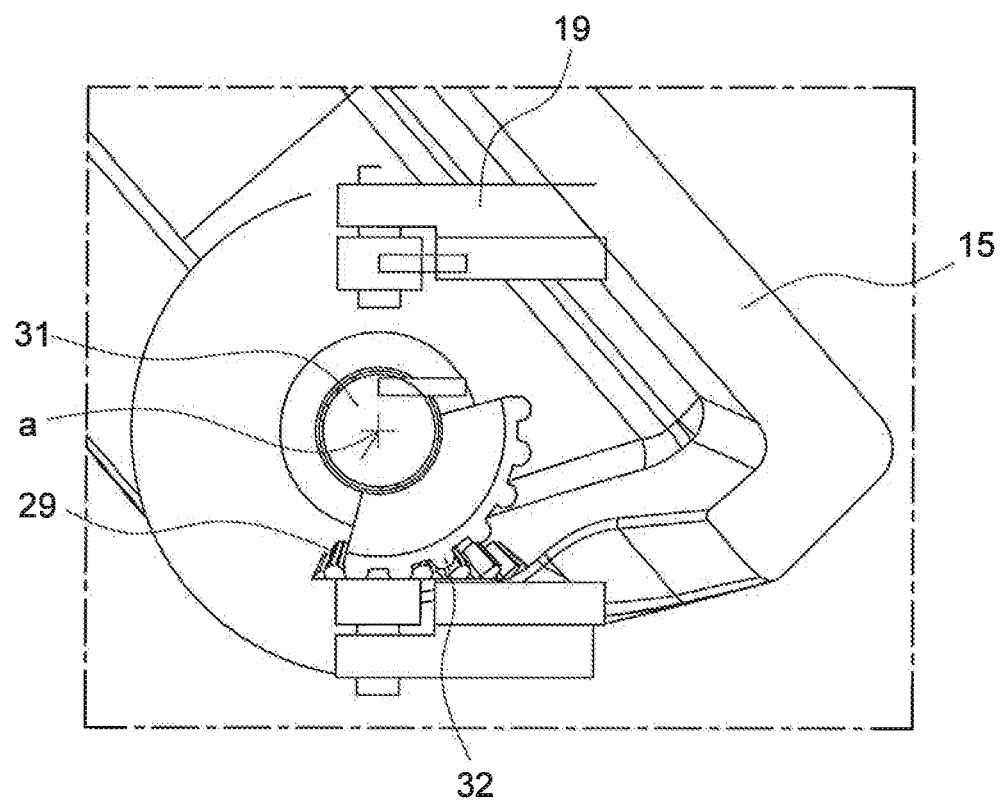
Figure 28:
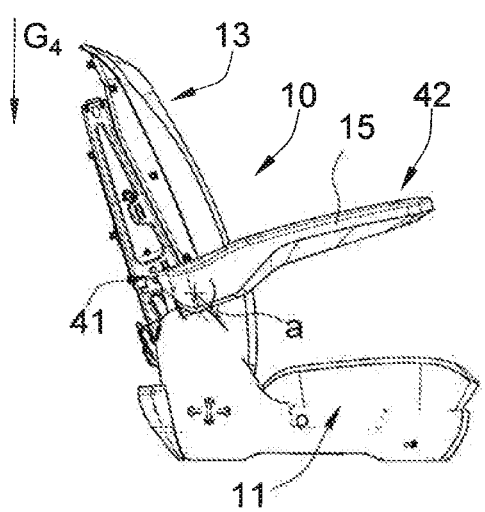
FIG. 28 is a side view of the vehicle seat, with the support in the distal position of the side mechanism and in the second position of the pivot assembly.
Figure 27:
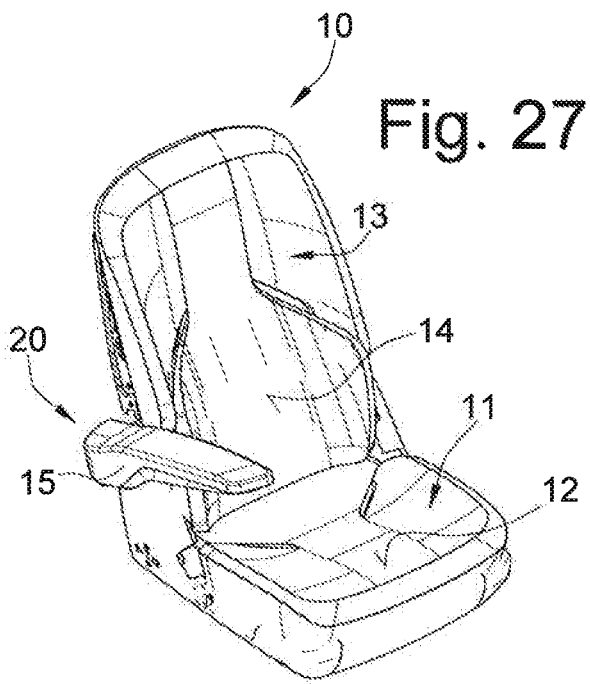
Figure 29:
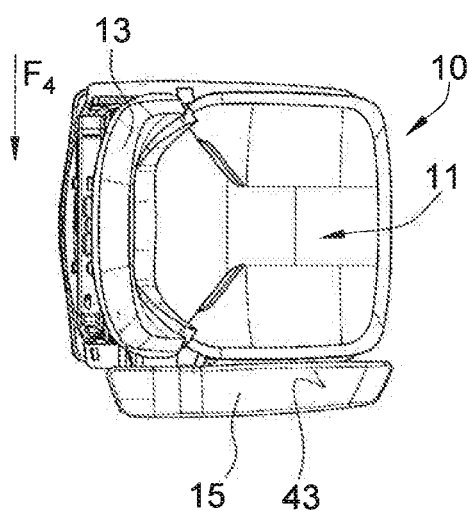
FIG. 29 is a top view according to arrow $G_4$ in FIG. 28.
Figure 30A:
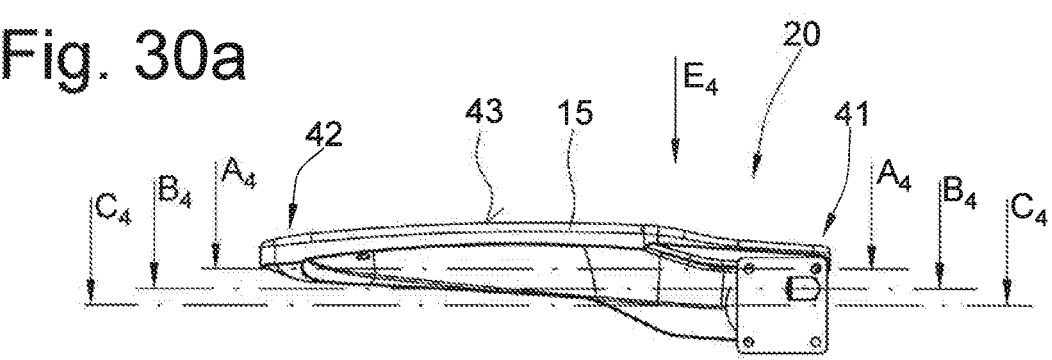
FIG. 30a is a side view of the armrest according to arrow $F_4$ in FIG. 29, the vehicle seat not illustrated for reasons of clarity.
Figure 35:
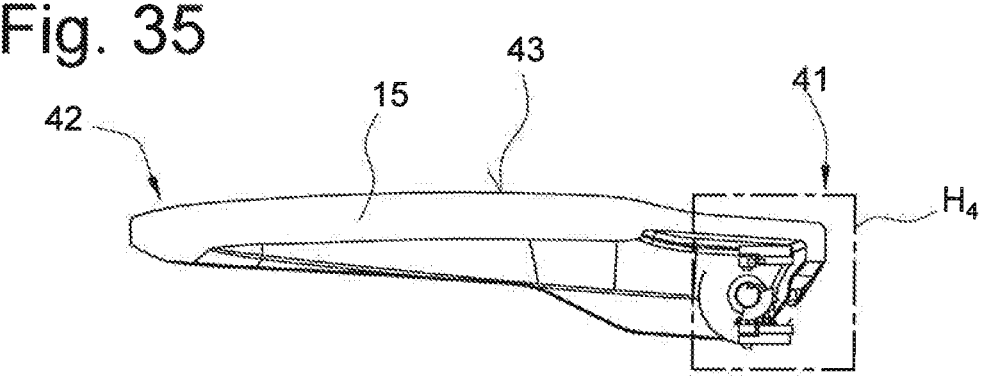
Figure 36:
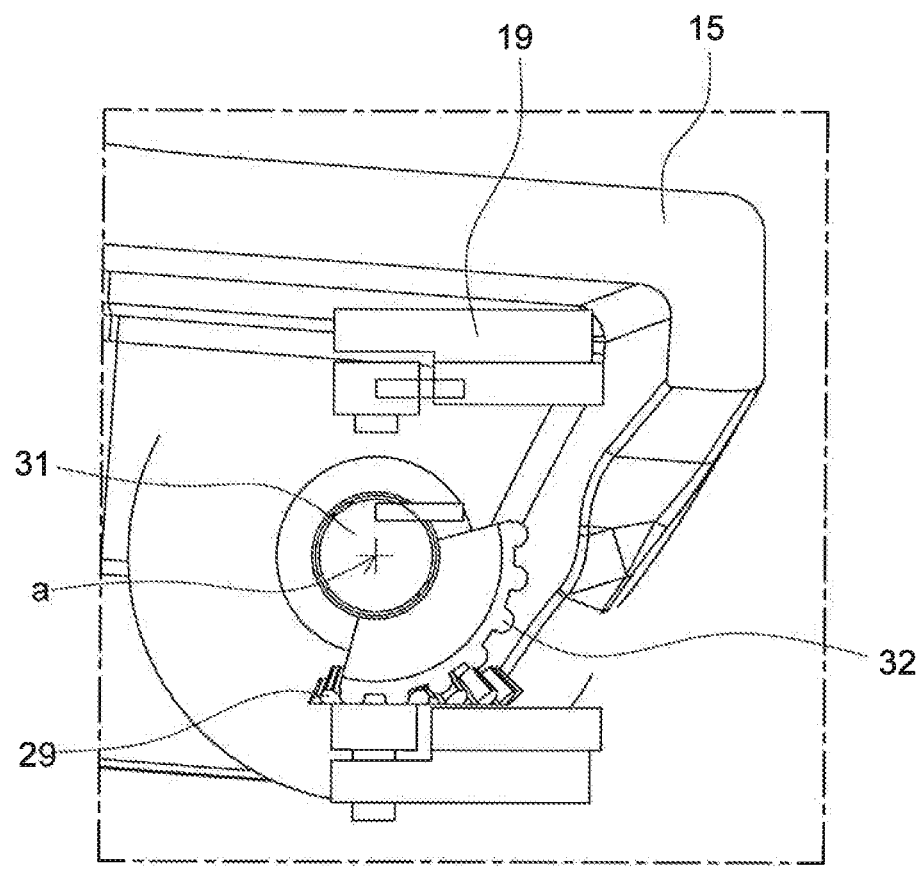
FIG. 36 is a detail view according to detail line $H_4$ in FIG. 35.

As soon as the side mechanism 27 has reached the third position, the lateral transmission 35 is in the position according to FIG. 23 and the slew transmission 36 is in the position according to FIG. 26*b*, that is, the gears 29 and 32 are on a second end region. The support 15 is shown in a 45° position according to FIGS. 20 to 26*b*, although, as explained above, it can move independently of the slew transmission 36, due to the freewheel ranges of the coupling 34. As soon as the position sensors of the sensor device 40 output a feedback that the third position is reached, the controller 30 outputs a signal to the lateral drive 27 to stop the drive 26.

The upward movement takes place in the opposite direction. The support 15 is manually moved from the third position into the second position, with the secondary drive mechanism 36 still being decoupled by the coupling 34. If the coupling formations 38 and 39 reach the engagement position, the coupling formation 39 is latched with the coupling formation 38—for example by a non-illustrated catch pin. Attainment of the second position of the support 15 is signaled from the sensor device 40 to the controller 30, whereupon the latter causes the drive 26 to move in the opposite direction in such a way that the support 15 pivots in the direction $u_2$.

After a pivot radius of about 45°, the support 15 has again reached the first position and the side mechanism 27 has reached the second position. Latching of the coupling formations 38 and 39 is now released. The coupling 34 allows for additional relative movement of the coupling formations 38 and 39 without moving the support 15 out of the first position. Further movement of the drive, i.e. of the motor 26, therefore has no impact on the pivot position of the support 15, because the latter is thereafter again in the freewheel range.

The side mechanism 27 can therefore be moved from the second into the first position. As soon as the first position has been reached, the controller 30 stops the drive.

The invention claimed is:

1. An armrest comprising:
   a base;
   a support for a vehicle seat;
   a side mechanism for pivoting the support relative to the base between a proximal position and a distal position;
   a pivot assembly for pivoting the support on the base between a first pivot position and a second pivot position, the side mechanism including a first part on the base and a second part on the support; and
   an articulation connecting the first part to the second part and including a four-bar linkage having four links for movement of the second part in a horizontal plane.

2. The armrest according to claim 1, wherein the pivot assembly includes a first pivot element on the second part and a support-fixed second pivot element, the first pivot element and the second pivot element together forming a pivot joint.

3. An armrest comprising:
   a base;
   a support for a vehicle seat;
   a side mechanism for pivoting the support relative to the base between a proximal position and a distal position;
   a pivot assembly for pivoting the support on the base between a first pivot position and a second pivot position, the side mechanism including a first part on the base and a second part on the support; and
   an articulation connecting the first part to the second part, the articulation including a four-bar linkage having four links, relative movement of one of the links of the linkage relative to an element of the four-bar linkage being at the same time a drive for a slew transmission.

4. The armrest according to claim 3, wherein the side mechanism is drivable by a lateral transmission comprising a first drive part on the first part and a second drive part engaged with the first drive part that is on the second part.

5. The armrest according to claim 4, further comprising:
   a drive that includes the side mechanism and/or the slew transmission as well as at least one motor and/or an energy-storage unit.

6. The armrest according to claim 4, wherein at least one drive of the side mechanism and the slew transmission includes a spindle engaged with a spindle nut, the spindle or the spindle nut being drivable.

7. The armrest according to claim 4, wherein at least one drive of the lateral transmission side mechanism and the slew transmission comprises a first toothed gear and a second toothed gear meshing therewith.

8. The armrest according to claim 4, wherein the side mechanism and/or the slew transmission are releasably couplable with the support by at least one coupling with a first coupling formation on the base and a second coupling formation on the support.

9. The armrest according to claim 8, wherein the first coupling formation is connected to a first drive part and the second coupling formation is connected to a second drive part of the side mechanism and/or of the slew transmission.

10. The armrest according to claim 4, further comprising:
a controller that controls the side mechanism and the slew transmission.

11. The armrest according to claim 10, further comprising:
a sensor device that includes position sensors that determine the position of the support and that transmit determined position data to the controller.

12. The armrest according to claim 10, further comprising:
an arresting device that can lock the side mechanism and/or the pivot assembly in at least one of the positions.

13. An armrest comprising:
a base;
a support for a vehicle seat;
a side mechanism for pivoting the support relative to the base between a proximal position and a distal position;
a pivot assembly for pivoting the support on the base between a first pivot position and a second pivot position, the side mechanism including a first part on the base and a second part on the support;
an articulation connecting the first part to the second part; and
a slew transmission driving the pivot assembly and comprising a first drive part on the second part and a second drive part engaged with the first drive part and on the support.

14. The armrest according to claim 13, wherein the articulation includes a four-bar linkage having four links.

* * * * *